June 26, 1934.   C. A. OSTLING ET AL   1,964,363
METHOD AND APPARATUS FOR MANUFACTURING TIRES
Filed July 11, 1930   7 Sheets-Sheet 2

INVENTORS
Carl A. Ostling
James J. McEwan
ATTORNEY

June 26, 1934.  C. A. OSTLING ET AL  1,964,363
METHOD AND APPARATUS FOR MANUFACTURING TIRES
Filed July 11, 1930  7 Sheets-Sheet 3

INVENTORS
Carl A. Ostling
James J. McEwan
ATTORNEY

June 26, 1934. C. A. OSTLING ET AL 1,964,363
METHOD AND APPARATUS FOR MANUFACTURING TIRES
Filed July 11, 1930  7 Sheets-Sheet 4
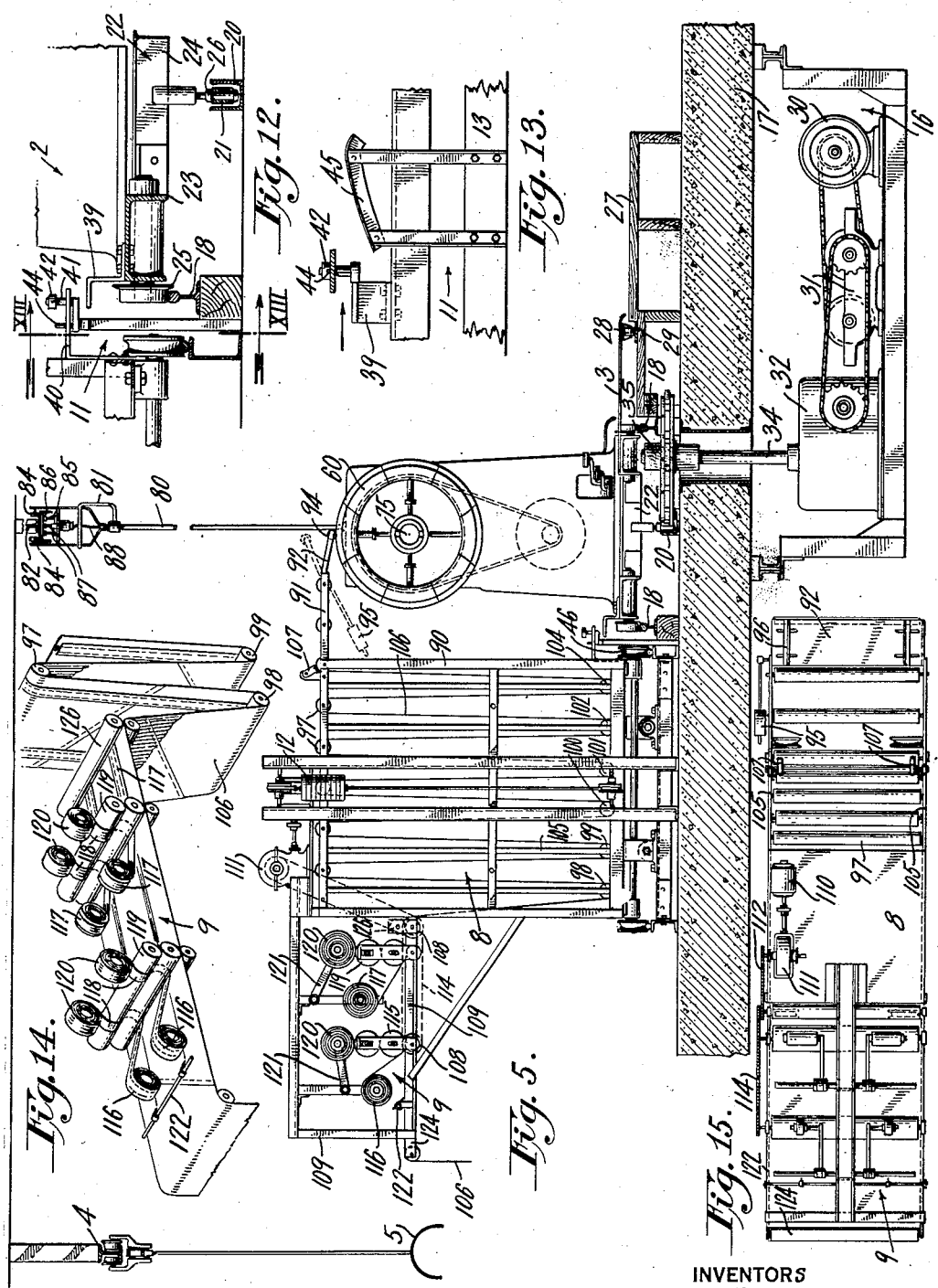
INVENTORS
Carl A. Ostling
James J. M<sup>c</sup>Ewan
ATTORNEY

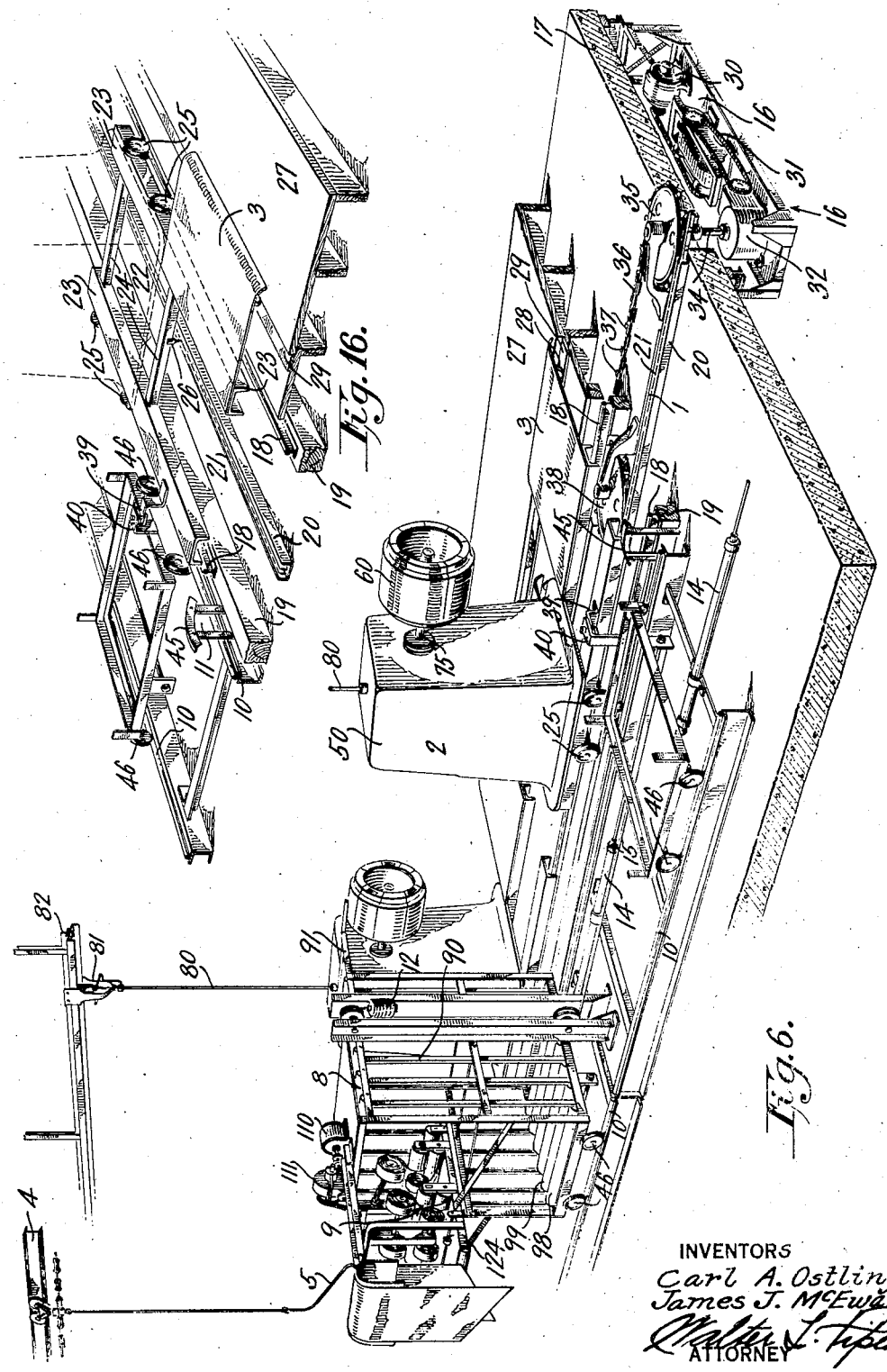

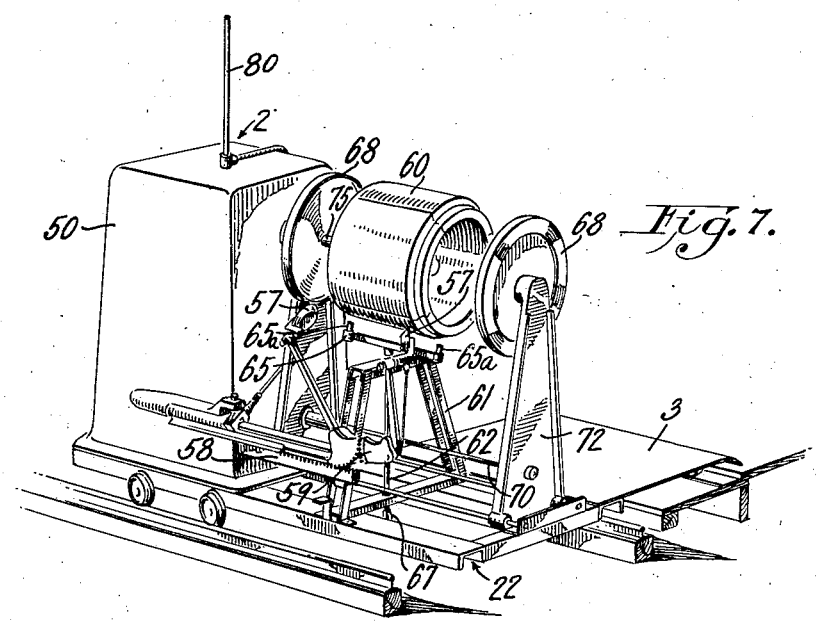
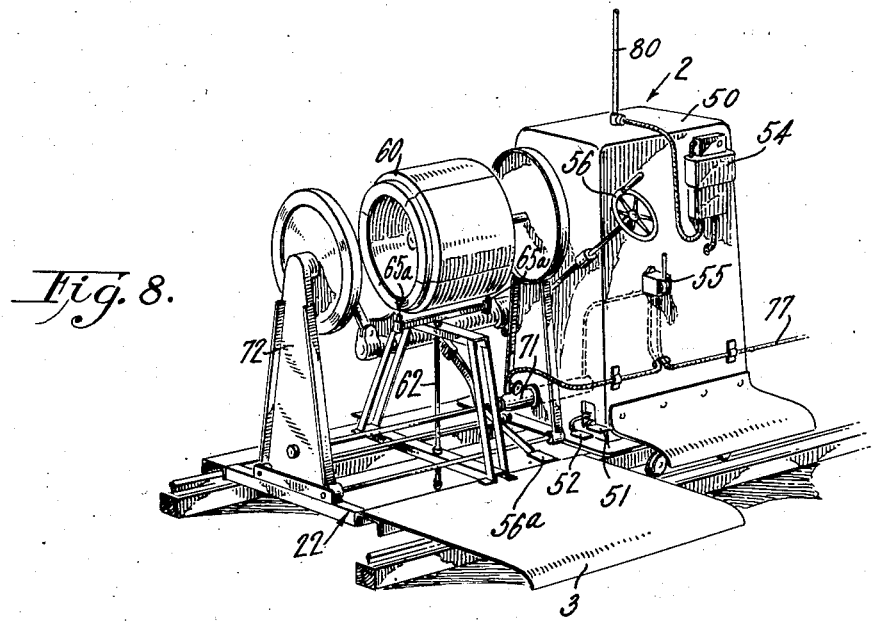

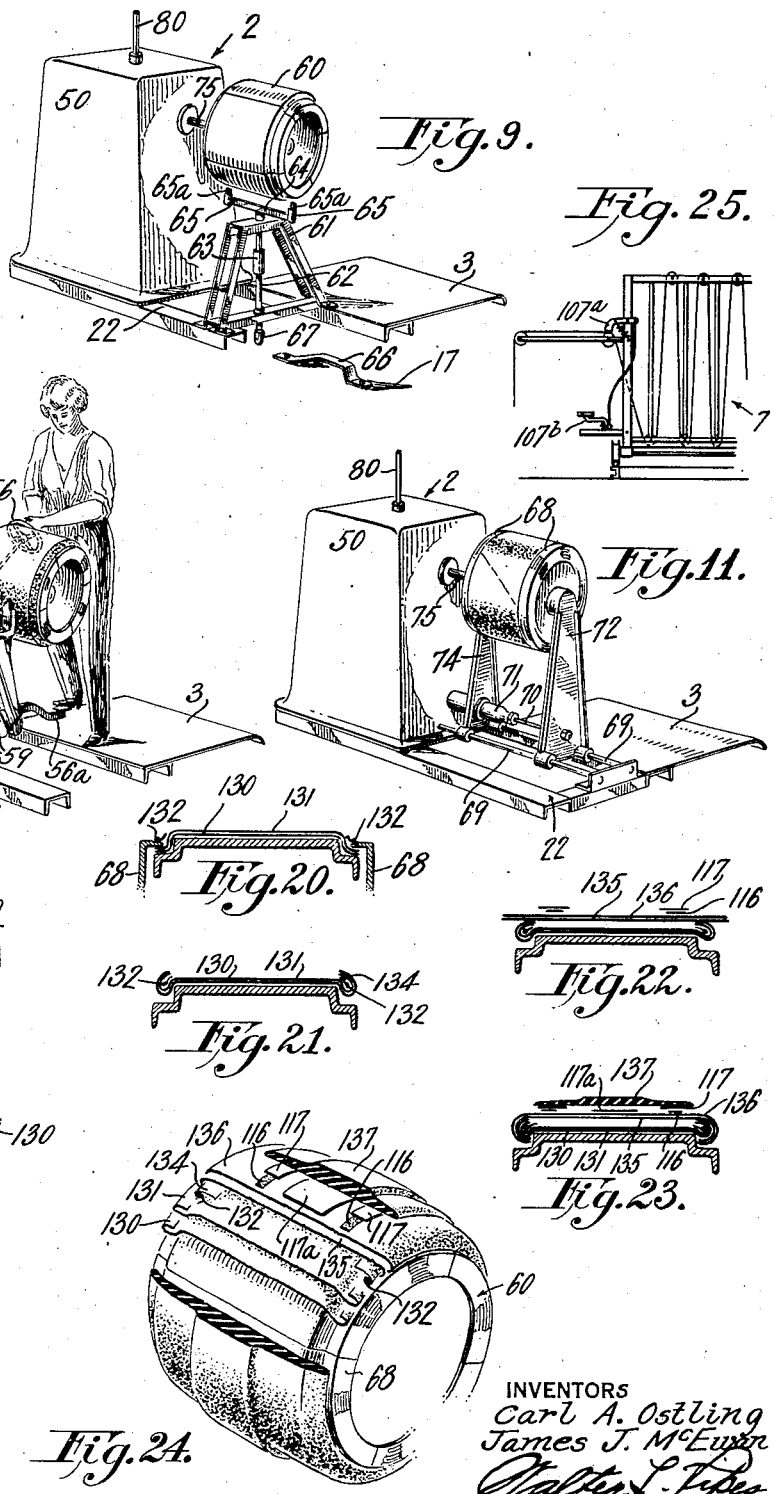

Patented June 26, 1934

1,964,363

UNITED STATES PATENT OFFICE 1,964,363

METHOD AND APPARATUS FOR MANUFACTURING TIRES

Carl A. Ostling and James J. McEwan, Pontiac, Mich., assignors to Morgan & Wright, Detroit, Mich., a corporation of Michigan Application July 11, 1930, Serial No. 467,259

48 Claims. (Cl. 154—14)

Our invention relates to methods and apparatus for manufacturing tires and more particularly to methods and apparatus for building pneumatic tires. The apparatus primarily comprises an endless chain conveyor adapted to carry tire building drums and accessory mechanisms along a track and in continuous motion, while operators apply material and perform certain manual duties thereon, in combination with mechanical means for supplying materials in sequence of operation and according to consumption requirements.

Heretofore it has been customary in the tire manufacturing art to provide individual machines comprising a drum or core on which the different layers of fabric, rubber and/or other materials, have been assembled and shaped into a partially completed tire by a single workman. This method of building tires requires that each workman possesses a complete knowledge of the different steps necessary to form each tire, and that he is acquainted with and able to handle the different sizes and shapes of materials going into the tire. Such a tire building operation necessitates that each workman be supplied with all of the different sizes, kinds and shapes of materials going into each tire. Where the machines are widely spaced, this distribution of material is troublesome and expensive. The operation also requires fully skilled workmen.

We provide a method and apparatus by which a plurality of tire drums or cores are mounted on an endless conveyor and are moved past successive stations. At each station a suitable apparatus is provided for supplying a layer of fabric or other material to the tire and/or for performing a definite operation upon the material carried by the core or drum. Provision is made for automatically coupling the machines at the stations to the conveyor in co-operative relation to the successive drums or cores. Provision is also made for automatically releasing the machines at the several stations upon the completion of their operations. Means are provided for returning the machines, after their disengagement, to such a position that they may again be connected to the main conveyor for performing a successive operation.

By segregating the several steps in the manufacture of each tire, and performing the steps at different locations, it is possible to utilize different operators for the several steps at the different stations. Such operators need be skilled in but a single operation as compared to possessing a knowledge of all the operations needed for building a single tire, as has heretofore been the common practice. By freeing the drums on the conveyor from some of the auxiliary mechanisms, each operation may be performed more expeditiously since the operator does not have to watch out for such auxiliaries. In the prior practice the auxiliary elements have been carried on the same base as the drum or core, and the operator must watch them at all times. Stated in another way, the number of tools required for use on a single machine are distributed over a plurality of stations with fewer tools at each station.

Provision is made by means of an auxiliary conveyor, for supplying the several stations with new material without interruption to the movement of the drums on the main conveyor. The space required for the apparatus is materially less than the space required for an equivalent number of stationary machines.

The accompanying drawings illustrate a present preferred embodiment of apparatus for practicing the invention, in which:—

Fig. 5 is an elevational view, partially in elevation and partially in section, taken substantially along the section line V—V of Fig. 2, and illustrates the building machine, fabric feeding device, and mechanism for driving the conveyor;

Fig. 6 is a diagrammatic perspective view, partially in elevation and partially in section, illustrating the mechanism shown in Fig. 5;

Fig. 7 is a perspective view of a tire building machine;

Fig. 8 is a similar view of the opposite side of the machine illustrated in Fig. 7;

Fig. 9 is a partial perspective view of a tire building machine illustrating the automatic means for applying adhesive to the drum;

Fig. 10 is a similar view of the tire building machine showing the stitching rolls and their operating mechanism;

Fig. 11 is a similar view of a tire building machine with the bead wire applying rings in their bead applying positions;

Fig. 12 is a view, partially in elevation and partially in section, illustrating the mechanical details for connecting the fabric feeding device to the main conveyor;

Fig. 13 is a sectional view thereof taken along the section line XIII—XIII of Fig. 12 with some of the details omitted;

Fig. 14 is an exploded diagrammatic view of the strip applying mechanism and fabric feeding device shown in Fig. 5; Fig. 15 is a plan view of the strip applying mechanism and fabric feeding device shown in Figs. 5 and 14;

Fig. 16 is a perspective view of the tracks, flooring construction and tripping mechanism;

Figs. 17 to 23 inclusive, show progressive diagrammatic sections of the tire as it is built up by the application of different materials;

Fig. 24 is a perspective view, partially in section, showing a completely assembled tire on a building drum; and Fig. 25 is a detail view showing a clutch mechanism for the fabric.

Figure 2:
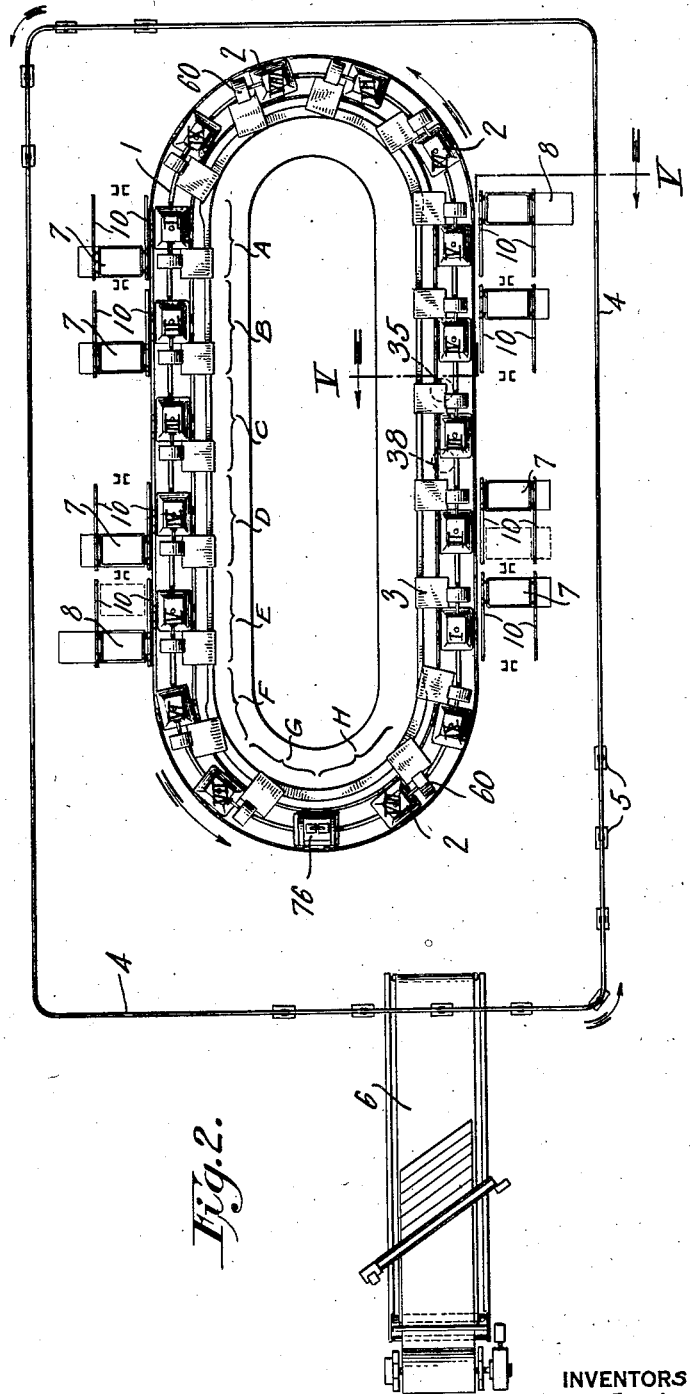
Fig. 2 is a diagrammatic plan view thereof.

In order that the operation of the apparatus may be thoroughly understood before proceeding with a detailed mechanical description, a brief description of the operations followed in the assembly and construction of a pneumatic tire is given. In the present application, a four-ply tire construction is explained. However, it is to be understood that the arrangement may be varied in accordance with the size and style of tire which is being manufactured, and should be considered as an example, and not as a limitation, of the invention. Fig. 2 of the drawings illustrates by the letters A to H, inclusive, the relative locations or stations wherein the successive operations are effected. Reference may also be made to Figs. 17 to 22, inclusive, which illustrate the progressive application of materials to a building drum.

In this system of tire manufacture the assembly of a four-ply tire band is divided into eight divisions corresponding to the several letters. Each division requires an operator who performs the duties prescribed within the location designated by the respective letter. It is to be understood, however, that the invention is applicable to tires other than a four-ply construction by suitably varying the number of stations in accordance with the number of operations required for other types of tires. The tire building mechanism herein illustrated comprises two complete sets of auxiliaries so that two tires are assembled on each drum during each complete movement of a building drum around the course of the conveyor.

The operations performed at the several stations are hereinafter described in detail.

Figure 1:
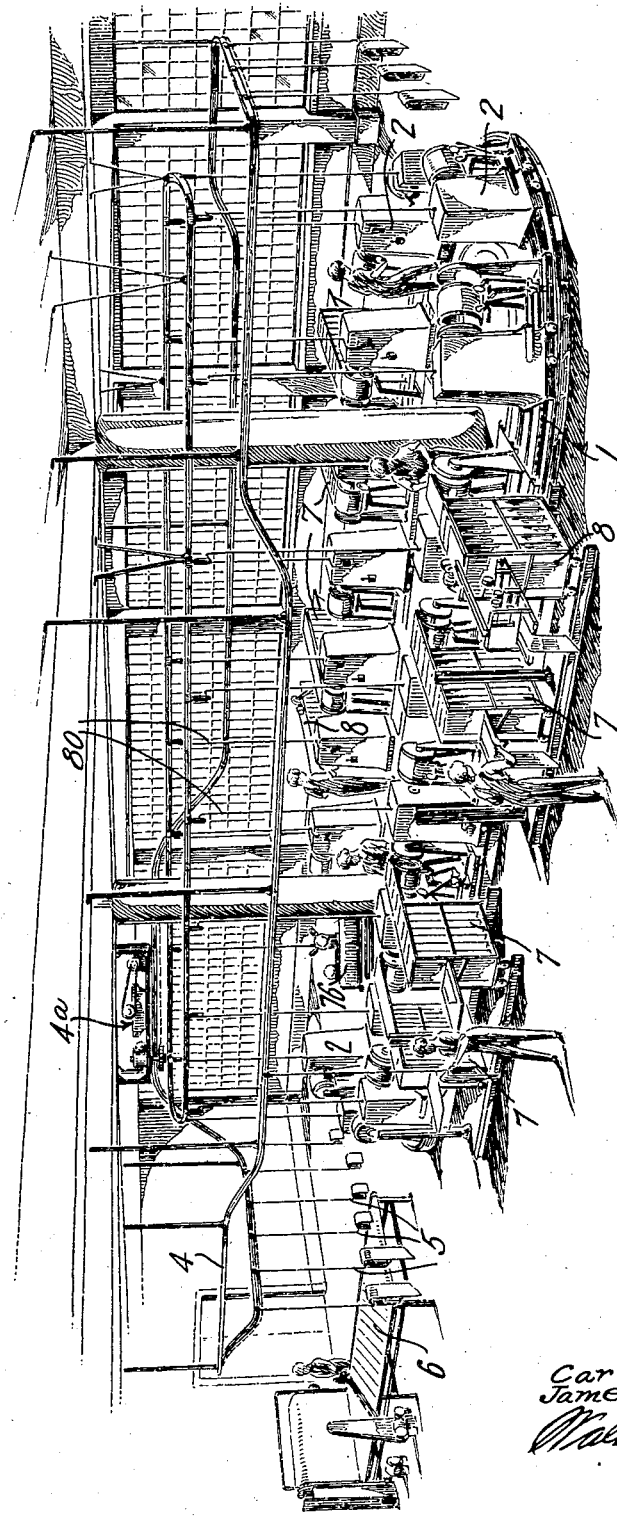
Figure 1 is a diagrammatic perspective view of an assembly of apparatus for practicing the invention.

Referring to the drawings and particularly to Figs. 1 and 2, the apparatus or mechanism for manufacturing tires comprises an endless conveyor 1 illustrated as traveling in substantially an oval path, although it is to be understood that the path of the conveyor may be varied, as desired. The conveyor is preferably continuously driven. A plurality of tire building machines 2 are mounted on the conveyor for movement therewith.

In the illustrative embodiment of the invention, enough of the tire building machines 2 are mounted on the conveyor to assemble two tire bands on each machine during a complete movement of each machine around the conveyor. For convenience, the several machines in Figs 1 and 2 have been given Roman numerals I to IX to indicate the relative instantaneous positions of the several machines 2. The first operation is performed as machine I moves through approximately the space A, illustrated in Fig. 2. At the same time machine II is traversing the space B for another operation and the other machines III to IX are traversing the spaces C to H, inclusive, the spaces A to H are not necessarily equal, as different times may be required for performing the different operations.

The details of each of the tire building machines 2 are shown in Figs. 7 to 11, inclusive. Each of these machines co-operates with an operator's platform 3 which moves with the machine.

For expediting the delivery of materials to the several tire building machines 2, as it is needed, a second conveyor 4 is disposed outside of the conveyor 1. The conveyor 4 is provided with a plurality of depending hooks 5 which carry strips of fabric from a machine 6, illustrated in the form of a bias cutting machine, to a plurality of feed racks or festooning devices 7 and 8 disposed about the conveyor 1. The means provided for actuating the conveyor 4 consists of the unit 4a which comprises a motor, a variable speed device and a speed reducing device. As illustrated in Fig. 1, the conveyor 4 is vertically positioned so that the suspended hooks are lower at the bias cutter and at the festoon devices to facilitate loading and unloading; but are otherwise sufficiently high from the floor so as to provide clearance for workers to pass thereunder. In the illustrative embodiment of the invention, three of the feed racks 7 and one of the racks 8 are required for the assembly of each tire band. As illustrated in Fig. 2, the racks 7 are provided at stations A, B and D and the racks 8 are provided at the stations E. The feed racks 8 differ from the feed racks 7 by incorporating a mechanism 9, illustrated in Figs. 5, 6, 14 and 15, for applying relatively narrow strips of fabric to the outer ply of fabric prior to application of the thread, as illustrated in Figs. 22, 23 and 24.

In a four-ply tire the major fabric plies are of two widths which are prepared on the same cutting machine 6, although it is to be understood that different numbers of major ply widths are required for other tire constructions. As hereinafter described, the feed racks 7 and 8 store up a sufficient quantity of fabric to permit of the continuous application of fabric to the tire building machine 2, as needed, so that the racks 7 and 8 may be replenished from the conveyor 4 at any time.

The feed racks 7 and 8 are mounted on separate tracks 10 disposed along the conveyor so that the racks are movable with the machines 2 to which fabric is being supplied. Mechanism 11 illustrated in detail in Figs. 12 and 13 is provided for automatically connecting the machines 2 to the several racks 7 and 8.

Figures 3, 4:
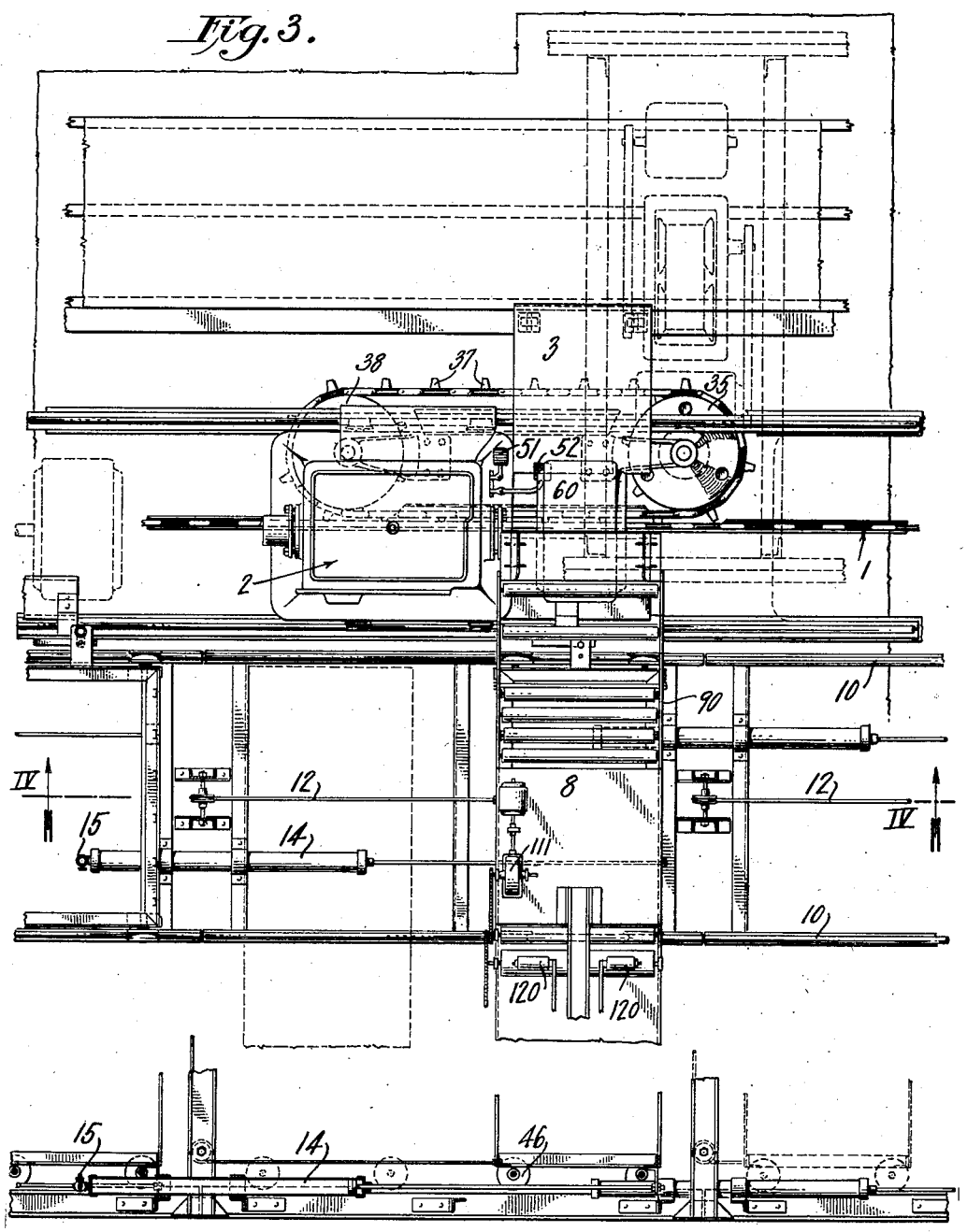
Fig. 3 is a detailed plan view of a section of the apparatus illustrating a tire building machine, fabric feeding device, and the conveyor driving mechanism.
Fig. 4 is a broken elevational view, partially in section, taken along the section line IV—IV of Fig. 3 and illustrates the fabric feeding device controlling means.

Provision for the return of the racks 7 and 8 to their initial positions upon their release from the machines 2 is provided by counterweights 12, illustrated in Figs. 3 and 6. A shock absorbing cylinder 14 is provided with each of the racks 7 and 8 for cushioning the return movement thereof. An escape valve 15 is provided on each cylinder 14 to regulate the speed of the return movement. The conveyor 1 is actuated by a unit 16, preferably disposed beneath the floor 17 supporting the mechanism as illustrated in Figs. 5 and 6.

The conveyor 1

Referring particularly to Figs. 3, 5, 6 and 16, the conveyor 1 comprises substantially parallel rails 18 mounted on timbers 19 resting on the floor 17. A channel 20 is disposed between the timbers 19 to serve as a guide for an endless chain 21. A plurality of frames 22 comprising inverted channel irons 23 and crossbars 24 are mounted on wheels 25 moving along the rails 18. Lugs 26 depending from certain of the crossbars 24 engage the links of the chain 21 for pulling the frames 22 along the conveyor. The machines 2 are mounted directly onto the frames 22. The inner beam 23 of each frame 22 carries one edge of the co-operating operators' platform 3. The other edge of the platform overhangs a stationary runway 27 and is supported by rollers 28 traveling along metallic strips 29.

The actuating unit 16 for the conveyor comprises a motor 30, which may be a variable speed motor, a speed changing device 31 and a speed reducing device 32. From the latter a shaft 34 extends upwardly through the floor 17 and terminates in a sprocket wheel 35. The sprocket wheel 35 drives a chain 36 having lugs 37 projecting therefrom. The chain 36 passes around a pulley 38 disposed between the channel 20 and one of the rails 18, so that the lugs 37 on the chain 36 may engage the links of the chain 21 along a cutaway portion of the guide 20. The intermeshing of the lugs 37 on the chain 36 with the links of the chain 21 drives the latter.

The connecting means 11

Referring particularly to Figs. 6, 12 and 13, the connections between each of the frames 22 supporting a tire building machine 2 and the racks 7 and 8, are made by providing an outwardly extending arm or bracket 39 on each frame 22. Each of the racks 7 and 8 is provided with an outwardly extending arm or bracket 40 which overhangs the arms 39 of the several frames 22. A lug 41 is loosely mounted in each bracket 40 to normally project therebeneath and is retained by a nut or collar 42. A tail piece 44 is provided on each of the lugs 41 for keeping the body of the lug 41 in substantial parallelism with the faces of the brackets 39. The tail piece 44 extends upwardly through an opening in the bracket 40. Accordingly, the body of each lug 41 normally extends below and parallel to the brackets 39 so that as the frames 22 advance along the conveyor 1, the brackets 39 engage the several lugs 41 to automatically pick up and carry the racks 7 and 8, as shown in Figs. 6 and 16.

For automatically disconnecting the racks 7 and 8 from the successive tire building machines 2, cams 45 are mounted at suitable intervals, depending upon the desired duration of engagement between the racks and machines, along the conveyor 1. The cam surfaces 45 are spaced outside of the projection of the brackets 39 so that as the racks 7 and 8 advance the lugs 41 ride up onto the cam surfaces 45, thereby lifting the lugs 41 out of engagement with brackets 39.

As soon as a lug 41 is disconnected from a bracket 39 the machine or rack carrying the lug 41 returns to its initial position by reason of its associated counterweight 12 and under the retarding influence of the associated shock absorber 14. It is to be understood that a positive drive may be provided for returning the machines to their initial positions, if desired. To prevent sidewise movement of the racks 7 and 8 while delivering fabric to the tire building machines 2, the tracks 10 are preferably made circular in cross section for co-operation with curved wheels 46 supporting the racks 7 and 8.

With this construction it is essential that the desired amount of material shall be applied to the tire building machine 2 before the machine has moved past the co-operating cam 45. This feature of the invention insures that the operators shall perform the allotted operations during the time that each machine 2 is passing the allotted station.

Tire building machine 2

Referring particularly to Figs. 7 to 11, inclusive, each tire building machine 2 comprises a housing 50 in which is mounted a motor brake and clutch (not shown). A pedal 51 projects from the housing 50 for operating the brake and a similar pedal 52 projects from the housing for operating the clutch. The pedals 51 and 52 are accessible from the platform 3. A motor starting switch 54 and an air valve 55 are mounted on the housing 50 within reach of an operator standing on the platform 3. A hand wheel 56 is provided for operating the stitcher rolls 57 through a rack 58 and gears 59, as shown in detail in Fig. 10. A pedal 56a is provided for applying pressure to the stitchers while being positioned along the drum by the hand wheel 56.

For initially and automatically applying adhesive to a collapsible drum 60 on which the tire band is assembled, a frame 61 is mounted on the frame 22 for supporting a sliding rod 62 having an adjusting coupling 63 and terminating in a crosshead 64. The crosshead 64 is provided with holders 65 for retaining the adhesive 65a. A cam track 66 is mounted on the floor 17 in the path of movement of a roller 67 carried by the rod 62. At the proper place in the movement of the conveyor the roller 67 on each machine 2 rides over the track 66 to raise the adhesive 65a into co-operative engagement with the drum 60. The purpose of the application of adhesive is to hold the first play to the drum. This adhesive applying construction is shown in detail in Fig. 9.

Referring particularly to Figs. 11 and 8, bead setting rings 68 are mounted on each frame 22 and actuatable along guide rods 69 by the action of a piston 70 moving in a cylinder 71. The piston 70 is connected to a support 72 for one of the bead rings 68, and the cylinder 71 is connected to a support 74 for the other bead ring 68. The shaft 75 supporting the drum 60 extends through the bead setting ring 68 adjacent to the housing 50 but is independent thereof. The valve 55 controls the actuation of the piston 70 and cylinder 71.

For supplying the several cylinders 70 with fluid under compression, a compressor 76 is mounted on the conveyor 1 and is inter-connected with the several machines 2 by flexible pipe lines 77. Manipulation of the valve 55 serves to bring the bead setting rings against the end of the drum 60 for applying beads to the carcass and to withdraw the bead setting rings after the application of the beads.

Electrical connections

For supplying electrical energy to each of the tire building machines, there is provided on each housing 50 an upwardly extending conduit 80. As particularly shown in Figs. 5 and 6, the several conduits 80 terminate in brackets 81 suspended from a track 82 by rollers 84. The inner surface of the track 84 carries electrical bus bars 85 on an insulating 87 carried by the bracket 81 conduct electrical energy from the bus bars and complete a circuit to wires 88 passing down the conduits 80 to the housings 50 and switches 54.

With this construction each machine is provided with an individual electrical connection to the several bus bars which connection is suspended from the track 82 so that the brushes move along the track 82 as the machines 2 move along the conveyor without subjecting the wires 88 to severe strains. As the brushes 87 are mounted overhead there is no danger of the operators' accidentally making contact therewith or with the electrically charged bus bars, which is a safety feature of some importance.

Fabric racks or festooning devices

Referring particularly to Figs. 3, 5, 6, 14 and 15, the festooning devices 7 and 8 have in common a frame 90 which is mounted on the curved wheels 46 heretofore referred to. Each frame 90 is provided with a projection 91 directed towards the conveyor 1. A balanced shelf 92 is disposed at the outer end of the projection 91 and terminates in a roller 94 so that fabric may be delivered to the surface of each drum 60 in substantially a tangential direction as the drum rotates about its supporting shaft 75, which extends in the general direction of movement of the conveyor 1.

When material is being drawn from a festooning device, the shelf 92 assumes the full line position shown in Fig. 5. However, when fabric is not being drawn therefrom, it assumes the dotted line position shown in the same figure, by reason of the counterweight 95. Guides 96 are provided on each shelf 92 for controlling the position of the fabric laterally of the frame as it leaves the shelf.

At the top of each frame 90 there are disposed a number of stationary rollers 97. At the bottom of each frame there are a number of rollers 98, 99, 100, 101, 102 and 104 (the exact number of which may be varied as desired) which are adapted for vertical movement in guideways 105 formed in the frames. Fabric 106 is looped about the rollers 97 and the rollers 98 to 104, inclusive, so that a considerable quantity may be stored in each festooning device. The rollers 98 to 104, inclusive, are graduated in weight so that as material is drawn from the festooning device the lower rollers are raised as the loops are shortened owing to withdrawal of material. The rollers 98 to 104, inclusive, are graduated in weight from three pounds to five pounds so that the fabric will not be called upon to raise all of the rollers at once unless the stock in the festooning device is very low. In general it is desired to place as little tension as possible upon the fabric 106 in order that it shall be delivered to the drums 60 in a natural condition.

A gravity operated pawl 107 with a tooth like surface contacting with the fabric is placed at the discharge end of each festooning device for limiting the movement of the fabric 106 in a single direction. A clamping device 107a operated by a treadle 107b within the reach of the operator is provided at the receiving ends of the festooning devices which do not have the feeding mechanism 9. By having a treadle operated device the fabric can be fed into the machine at the will of the operator without danger of losing the end of the fabric.

The festooning devices are replenished by operators who take the material from the hooks 5 and attach an end to the end of the material already in the festooning device. The material is then fed into the festooning device and stored between the stationary and movable rollers. In this manner material may be supplied to the festooning device at any time regardless of movement or whether the material is being withdrawn at the other end thereof.

The festooning devices 8, in addition to the structure of the festooning devices 7, are provided with the mechanism 9 which is adapted to apply relatively narrow strips of material to the last ply placed on the tire.

The mechanism 9 each comprises a plurality of rollers 108 mounted at the bottom of a frame 109 and which are driven from a motor 110 through a reduction gearing 111 and chain drives 112 and 114. The rollers 108 cause the fabric 106 to move beneath pressure rollers 115 which apply fabric strips 116 and 117. As the material for the strips 116 and 117 is supplied in rolls which are adhesive or tacky, it is necessary to place liner strips 118 between the adjacent convolutions. These liner strips are doubled back around the rollers 115 and over rollers 119 to take up reels 120 which are carried on arms 121 mounted on the frame of the mechanism 9, which also supports the rolls of material 116 and 117. As the strips 116 and 117 are applied to the fabric strip 106 under motive power, the liners are positively reeled up.

A scribing device 122 may be provided for indicating on the fabric strip 106 the proper positioning for the strips 116 and 117. A shelf 124 is provided at the end of the mechanism 9 for receiving and splicing the new strips as they are received from the conveyor 4. A roller 126 cooperating with one of the rollers 108 at the discharge end of the mechanism 9 is maintained under tension to insure an effective grip with the adjacent roller 108 for driving the fabric 106.

Operation

In the operation of a tire building mechanism embodying our invention, operators corresponding to the stations A to H, inclusive, shown in Fig. 2, are disposed along the conveyor and each performs a definite set of operations in the assembly of the tire casing on the collapsible drum 60. The successive steps in the assembly of the tire are diagrammatically shown in Figs. 17 to 24, inclusive.

An operator at station A collapses the drum 60, if not already collapsed from the preceding operation, and obtains two bead rings. The first bead ring is placed over the drum and adjusted on the ring 68 through which the shaft 75 extends. The drum is then expanded by any suitable mechanism (not shown). Thereafter the operator places the second bead wire in the outer head ring 68. At the same time the roller 67 strikes the cam track 66 and automatically causes the adhesive contained in the holders 65 to be applied to the drum. The contact persists through at least a complete revolution of the drum.

At the same time the connecting mechanism 11 becomes operative to engage the first festooning device 7, which is locked in a co-operating position to the tire building machine 2 and moves therewith. The clutch pedal 52 is depressed by the operator to disconnect the drum 60 from the motor. The operator then applies the first ply 130. The ply 130 is patted on the drum to which it is held by the adhesive previously applied, while the drum is rotated by hand, until the drum is completely covered with the fabric and a small margin is provided for a splice. The operator then tears the ply 130 from the fabric strip 106. Thereafter the first festooning device 7 is disconnected by the automatic operation of the connecting device 11 and returns to its initial position as heretofore described. Operator A then dismounts from the platform 3 and returns along the conveyor to perform the same operation upon the succeeding tire machine 2.

For clearness, the foregoing operation may be considered as being performed by operator A upon the tire machine marked I, in Figs. 1 and 2. Subsequently the operator B takes the same tire building machine 2, then in the position indicated by II. Operator B splices the overlapping ends of the ply 130, while the second festooning rack 7 is automatically connected to the conveyor. Ply 131 is placed on the drum, torn and patted down as shown in Fig. 18. The drum is then mechanically driven while the stitcher rolls shown in Fig. 10 are set in operation for rolling the plies 131 and 130 from the center to the edges. This operation smooths the plies and causes a uniform coherence therebetween. When this operation is completed operator B leaves the machine which is then in the position indicated by III.

At this point operator C manipulates the air valve 55 to cause the bead rings 68 to advance toward the drum as shown in Fig. 20. By using a hand tool the operator separates the bead wires 132 from the rings 68. The rings are pressed firmly in contact with the carcass, and with the bead flipper strip 134 are stitched down onto the second ply 131. The air valve 55 is operated to cause the rings 68 to recede from the ends of the drums 60. Gasoline is applied to the carcass surface with a brush or swab and the task is completed. During the operations at station C the drum is mechanically driven.

The drum then passes onto position IV where operator D engages the assembly near the drum edge and turns the edges of plies 130 and 131 over the bead wires 132, as shown in Fig. 21. The turned back edges are stitched down onto the carcass while the drum is rotating. The third festooning device 7 makes automatic connection with the conveyor and the third ply 135 is transferred to the drum, measured, severed and spliced. During this time the drum has travelled to the beginning of zone E, as indicated by V.

In zone E the festooning rack 8 is connected in the same manner as the preceding festooning racks and another operator transfers the fourth ply 136 with the attached strips 116 and 117 onto the carcass. Another strip 117a may also be applied. Before splicing, the strips 116 and 117 are peeled back from one end of the ply for a distance equivalent to the distance of the overlap in order that the thickness of the splice will remain substantially the same as that of the remaining carcass. The peeled back material is cut off and the splice is made. The machine 2 is then in zone F, as indicated by VI.

Operator F applies gasoline to the surface of the carcass and obtains a tread strip 137 from a rack. The tread is placed on the carcass, the ends painted with gasoline and joined together. The tread application is continued by operator G in the G zone while the machine is in the position indicated by VII. Here the tread is patted down to remove irregularities, and the stitching mechanism shown in Fig. 10 is actuated to further compress the materials. The splice is also stitched at the joints and the loose thin edges of the tread are trimmed.

The final operation in zone H, indicated by VIII on a tire building consists of tucking plies 135 and 136 around and under the bead wires thus completing the assembly operation. Operator H, or a subsequent operator, when the tire building machine is in the position indicated by the numeral IX, or before, collapses the drum, removes the carcass, and the machine is ready for the assembly of a second tire during the remaining half of its trip around the conveyor.

It is to be understood that the foregoing detailed description of the operations performed at each of the stations is by way of illustration of the invention and is not a limitation thereof as the number of operations could be varied at the several stations in accordance with the type of tire being constructed.

Also the term "endless conveyor" as used in the specification and claims includes any mechanism adapted to carry or move a tire building machine from an initial position through a definite path past instrumentalities for forming the tire band and return the machine to its initial position preparatory to another movement through the path.

While we have shown and described the present preferred embodiment of the invention and method of practicing the same, it is to be understood that it may be otherwise embodied and practiced within the scope of the appended claims.

Having thus described our invention, what we claim and desire to protect by Letters Patent is:

1. Tire building mechanism comprising an endless conveyor having a plurality of tire building machines carried thereby, a plurality of machines mounted adjacent to said conveyor for supplying component parts of a tire, and means for causing said tire building machines to successively engage said supplying machines for continuous movements during tire forming operations and for then causing their separation.

2. Tire building mechanism comprising an endless conveyor having a plurality of tire building machines carried thereby, a plurality of machines mounted adjacent to said conveyor for supplying component parts of a tire, means for causing said tire building machines to successively engage said supplying machines for continuous movements during tire forming operations and for then causing their separation, and means for causing said supplying machines to return to their initial positions after their separation from the tire forming machines.

3. In the method of forming a tire on a continuously moving tire building drum, the step consisting in automatically applying adhesive to the drum surface in accordance with the movement of the drum.

4. In the method of forming a tire on a continuously moving tire building machine, the steps consisting in causing successive operators to move with the machine while performing definite operations in assembling a tire on the machine.

5. In the method of forming a tire on a continuously moving tire building drum, the steps consisting in temporarily moving auxiliary devices with the moving drum while transferring materials to the drum.

6. In a tire building mechanism, an endless conveyor moving in substantially a single plane, a plurality of tire building machines mounted thereon, and devices disposed adjacent to the conveyor for successively supplying materials to said machines during their movement with the conveyor.

7. In a tire building mechanism, an endless conveyor moving in substantially a single plane, a plurality of tire building machines mounted thereon, devices disposed adjacent to the conveyor for successively supplying materials to said machines during their movement with the conveyor, an automatically operative means for co-operatively attaching and detaching said devices relative to said machines during movement of the latter.

8. In a tire building mechanism, an endless conveyor moving in substantially a single plane, a plurality of tire building machines mounted thereon, devices disposed adjacent to the conveyor for successively supplying materials to said machines during their movement with the conveyor, and means for co-operatively attaching and detaching said devices relative to said machines during movement of the latter.

9. In a tire building mechanism, an endless conveyor moving in substantially a single plane, a plurality of tire building machines mounted thereon, separately mounted movable devices disposed adjacent to the conveyor for successively supplying materials to said machines during their movement with the conveyor, and means for co-operatively attaching and detaching said devices relative to said machines during movement of the latter so that the devices move with the machines while supplying material thereto.

10. In a tire building mechanism, a conveyor, a plurality of tire building machines mounted thereon, separately mounted movable devices disposed adjacent to the conveyor for successively supplying materials to said machines during their movement with the conveyor, means for co-operatively attaching and detaching said devices relative to said machines during movement of the latter so that the devices move with the machines while supplying material thereto, and means for returning the devices to their initial positions upon their release.

11. A tire building mechanism comprising a conveyor and a plurality of tire building machines mounted thereon, each of said machines comprising an individual motor drive and stitching means.

12. A tire building mechanism comprising a conveyor, a plurality of tire building machines mounted thereon and each comprising a pneumatically operated element, a compressor mounted on said conveyor, and flexible connecting means between said compressor and elements.

13. A tire building mechanism comprising a conveyor, a plurality of tire building machines mounted thereon, and supporting means for a machine operator movable with the conveyor.

14. A tire building mechanism comprising a conveyor, a plurality of tire building machines mounted thereon, and a platform movable with the conveyor adjacent to each machine for supporting a machine operator.

15. A tire building mechanism comprising a conveyor, a plurality of tire building machines mounted thereon, a platform movable with the conveyor adjacent to each machine for supporting a machine operator, and a separate track for at least in part supporting said platforms.

16. In a method of building tires on successive moving drums, the steps consisting in imparting continuous translatory movement to the drums, causing the drums to successively move with material supplying devices while the latter supply component tire parts to the drums, and causing the same operator to move with the successive drums while applying material from one of the devices, whereby the same operator performs the same operation on all of the drums.

17. In a method of building tires on successive moving drums, the steps consisting in imparting continuous translatory movement to the drums, causing the drums to successively move with material supplying devices while the latter supply component tire parts to the drums, and causing a single operator for each device to successively move with and perform an operation on the several drums, whereby the same operator performs the same operation on all of the drums.

18. In a tire building mechanism, a conveyor, a tire building machine mounted thereon, an outwardly projecting arm disposed on said conveyor adjacent to said machine, a separately mounted movable device, and a second arm carried by said device and terminating in an element for engaging the first named arm to cause said machine and device to move together.

19. In a tire building mechanism, a conveyor, a tire building machine mounted thereon, an outwardly projecting arm disposed on said conveyor adjacent to said machine, a separately mounted movable device, a second arm carried by said device and terminating in an element for engaging the first named arm to cause said machine and device to move together, and means disposed in the path of travel of said element for disengaging said element and arm.

20. In a tire building mechanism, a conveyor, a tire building machine mounted thereon, an outwardly projecting arm disposed on said conveyor adjacent to said machine, a separately mounted movable device, a second arm carried by said device and terminating in an element for engaging the first named arm to cause said machine and device to move together, and a cam track disposed in the path of travel of said element for disengaging said element and arm.

21. In a tire building mechanism, a conveyor, a tire building machine mounted thereon, an outwardly projecting arm disposed on said conveyor adjacent to said machine, a separately mounted movable device, a second arm carried by said device and terminating in a relatively movable depending element for engaging the first named arm to cause said machine and device to move together, and means disposed in the path of travel of said element to raise it to free said arm for releasing said device.

22. In a tire building mechanism, a conveyor, a plurality of tire building machines mounted thereon, means disposed along said conveyor for supplying materials to said machines, and a second conveyor substantially paralleling the first conveyor throughout most of its length for transporting materials to said supplying means.

23. In a tire building mechanism, a conveyor, a plurality of tire building machines mounted thereon, means disposed along said conveyor for supplying fabric strips to said machines, and a second conveyor for continuously circulating said strips within the reach of operators at said supplying means.

24. In a tire building mechanism, a conveyor, a plurality of tire building machines mounted thereon, a plurality of festooning devices disposed along the conveyor and having limited movement relative thereto for transferring materials to said machines, and a second conveyor for transporting materials to said festooning devices.

25. In a tire building mechanism, a conveyor, a plurality of tire building machines mounted thereon, a plurality of festooning devices disposed along the conveyor and having limited movement relative thereto for transferring materials to said machines, a second conveyor for transporting materials to said festooning devices, and a machine for preparing said materials.

26. In a tire building mechanism, a conveyor, a plurality of tire building machines mounted thereon, a plurality of festooning devices disposed along the conveyor and having limited movement relative thereto for transferring materials to said machines, a second conveyor for transporting materials to said festooning devices, and a bias cutting machine for preparing said materials.

27. In a tire building mechanism, a conveyor, a plurality of separately motor-driven tire building machines mounted thereon, electrical bus bars disposed in co-operative relation to the conveyor and conforming to the outline thereof, and electrical connections between the several machines and the bus bars.

28. In a tire building mechanism, a conveyor, a plurality of separately motor-driven tire building machines mounted thereon, electrical bus bars disposed in co-operative relation to the conveyor and conforming to the outline thereof, and electrical connections between the several machines and the bus bars, said connections comprising a supporting track adjacent to said bus bars, and a carriage supporting a plurality of brushes engaging the bus bars.

29. In a tire building mechanism, an endless conveyor, a plurality of motor driven tire building machines mounted thereon, electric bus bars supported in co-operative relation to the conveyor and conforming to the outline thereof, and movable connections between the several machines and the bus bars.

30. In a tire building mechanism, a conveyor, a plurality of tire building machines mounted thereon and each comprising a rotary tire forming drum, means associated with each machine for applying an adhesive to said drum, and means for actuating said adhesive applying means in accordance with movement thereof.

31. In a tire building mechanism, a conveyor, a plurality of tire building machines mounted thereon and each comprising a rotary tire forming element, means associated with each machine for applying an adhesive to said element, and a cam disposed in spaced relation to the conveyor for engaging and actuating said adhesive applying means during movement of the tire building machines.

32. In a tire building mechanism, a conveyor, a plurality of tire building machines mounted thereon and each comprising a rotary tire forming element, means associated with each machine for applying an adhesive to said element, and a cam disposed beneath the conveyor for successively engaging the adhesive applying means of the several machines during their movement with the conveyor.

33. A tire building mechanism comprising a conveyor, a plurality of tire building units mounted thereon, a plurality of material supplying devices mounted along said conveyor, means for periodically connecting said material supplying means to the successive tire building machines for movement therewith, and means for returning said supplying means to their initial positions comprising a counterweight associated with each of said supplying means.

34. A tire building mechanism comprising a conveyor, a plurality of tire building units mounted thereon, a plurality of material supplying devices mounted along said conveyor, means for periodically connecting said material supplying means to the successive tire building machines for movement therewith, and means for returning said supplying means to their initial positions comprising a counterweight and a shock absorber for each of said means.

35. A tire building mechanism comprising a conveyor, a plurality of tire building units mounted thereon, a plurality of material supplying devices mounted along said conveyor, means for periodically connecting said material supplying means to the successive tire building machines for movement therewith, means for returning said supplying means to their initial positions comprising a counterweight, shock absorbing means, and means for varying the effectiveness of the shock absorbing means for each of the supplying means.

36. In a tire building mechanism, a conveyor, a tire building machine mounted thereon and comprising stitching means and a shaft extending in the general direction of movement of the conveyor and a tire forming element carried thereby, material supplying means disposed along the conveyor for supplying material to said tire forming element in a substantially tangential direction preparatory to the operation of said stitching means, and means co-operating with a portion of each supplying means for transporting tire forming materials thereto.

37. A tire building mechanism comprising an endless conveyor disposed in substantially a single plane, a plurality of tire building machines mounted thereon, and a platform associated with each machine and projecting inwardly of the conveyor.

38. A tire building mechanism comprising a tire building machine, a conveyor for transporting said machine, and means for supplying electrical energy and fluid under pressure to said machine during movement thereof.

39. In a tire building mechanism, a conveyor track for transporting a tire building machine, and a second track disposed in substantial parallelism with the first named track for a portion of the length thereof for supporting a device for supplying material to the tire building machine during movement thereof.

40. In a tire building mechanism, a conveyor, a tire building machine mounted on said conveyor, and a plurality of cams disposed in spaced relation relative to said conveyor for controlling the operation of different mechanisms associated with the building of a tire on said machine.

41. In a tire building mechanism, a conveyor, a tire building machine movable therewith and comprising a plurality of manually and pedally operated elements, and an operator's platform associated with said machine and movable therewith whereby an operator standing on said platform may operate said elements regardless of the movement of said machine.

42. In an apparatus for building flat band tire casings, a plurality of drums upon which tire constituents may be assembled together, means for rotating said drums, means for bodily moving said drums in an endless path and completing a circuit thereof at a predetermined time interval, and a plurality of independent means for supplying tire constituents to said drums in their movement around said endless path, at least some of which means are movable bodily with said drums for a portion of their travel.

43. A tire building mechanism comprising a conveyor, a plurality of tire building machines mounted thereon and each comprising a pneumatically operated bead setting device, a compressing means mounted on said conveyor, and flexible connecting means between said compressing means and devices.

44. In a tire building mechanism, an endless conveyor, and a plurality of tire building machines mounted thereon and movable therewith, each of said machines comprising bead setting and stitching devices whereby stitching and bead setting operations may be performed during movement of each machine with the conveyor.

45. In a tire building mechanism, an endless conveyor, and a plurality of tire building machines mounted thereon and movable therewith, each of said machines comprising bead setting devices, stitching devices, and controlling means therefor whereby stitching and bead setting operations may be performed during the movement of each machine with the conveyor.

46. In a tire building mechanism, a conveyor, a tire building machine movable therewith and comprising a plurality of tire shaping devices controllable by an operator, an operator's platform associated with said machine and movable therewith whereby an operator standing on said platform may operate said devices regardless of the movement of said machine.

47. In a tire building machine, a movable tire building drum, and means movable with said drum for supplying plies and strips of fabric thereto.

48. In the method of forming a tire, the steps consisting in imparting continuous translatory movement to a tire building form, causing successive mechanisms to supply component tire parts to said form during the movement thereof, and causing other instrumentalities to operate on the material assembled on the form during such translatory movement whereby the component parts of a tire are assembled and shaped on said form during its continuous translatory movement.

CARL A. OSTLING.
JAMES J. McEWAN.